(12) United States Patent
Henmi

(10) Patent No.: US 9,077,840 B2
(45) Date of Patent: Jul. 7, 2015

(54) IMAGE PROCESSING DEVICE, IMAGE FORMATION SYSTEM AND IMAGE PROCESSING METHOD

(71) Applicant: Oki Data Corporation, Tokyo (JP)

(72) Inventor: Yusuke Henmi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/063,783

(22) Filed: Oct. 25, 2013

(65) Prior Publication Data

US 2014/0118797 A1 May 1, 2014

(30) Foreign Application Priority Data

Oct. 29, 2012 (JP) ................................. 2012-237498

(51) Int. Cl.
*H04N 1/00* (2006.01)
*H04N 1/40* (2006.01)

(52) U.S. Cl.
CPC ....... *H04N 1/00968* (2013.01); *H04N 1/00331* (2013.01); *H04N 1/00816* (2013.01)

(58) Field of Classification Search
USPC .......................... 358/461, 453, 1.11, 518, 520
See application file for complete search history.

(56) References Cited

U.S. PATENT DOCUMENTS

2002/0141003 A1* 10/2002 Chang et al. .................. 358/518
2014/0049788 A1* 2/2014 Inamoto et al. ............. 358/1.11

FOREIGN PATENT DOCUMENTS

| JP | 2005217599 A | 8/2005 |
|----|--------------|--------|
| JP | 2006339984 A | 12/2006 |
| JP | 2010268399 A | 11/2010 |
| JP | 2011-097228 A | 5/2011 |

* cited by examiner

*Primary Examiner* — Quang N Vo

(74) *Attorney, Agent, or Firm* — Muncy, Geissler, Olds & Lowe, P.C.

(57) ABSTRACT

An image processing device includes an image acquisition part acquiring first image data, a character detector detecting, based on the first image data, data of a character area in the first image data, a marking detector detecting, based on the first image data, data of a marking area in the first image data, an image adjustment area determination part determining, based on a detection result of the character detector and a detection result of the marking detector, data of an image adjustment area in the first image data, and an image processing part subjecting the data of the image adjustment area in the first image data to image processing to output second image data.

19 Claims, 15 Drawing Sheets

Fig. 7A

| -1 | 0 | 1 |
|----|---|---|
| -2 | 0 | 2 |
| -1 | 0 | 1 |

Fig. 7B

| -1 | -2 | -1 |
|----|----|----|
| 0  | 0  | 0  |
| 1  | 2  | 1  |

Fig. 14

Character Area S43a1

A B C D E

Character Area S43a2

F G H I J

Character Area S43a3

K L M N O

Character Area S43a4

P Q R S T

Marking Area S44d

Character Area S43a5

U V W X Y

Character Area S43a6

Z a b c d

IMAGE PROCESSING DEVICE, IMAGE FORMATION SYSTEM AND IMAGE PROCESSING METHOD

CROSS REFERENCE TO RELATED APPLICATION

The present application is related to, claims priority from and incorporates by reference Japanese Patent Application No. 2012-237498, filed on Oct. 29, 2012.

TECHNICAL FIELD

The present invention relates to an image processing device provided with an image obtaining device that obtains first image data and subjects the first image data to image processing to output second image data, and an image forming system and the method therefore

BACKGROUND

Conventionally, for example, Patent Document 1 listed below discloses a technology that relates to an image reading device and an image forming device that allow a user to conveniently input an image processing condition.
[Patent Document 1] Japanese Patent Laid-Open Publication No. 2011-97228.

However, in the processing device disclosed in the above Patent Document 1, obtained first image data is uniformly subjected to image processing with respect to an entire original document. Therefore, when a user marks an area of a part of the original document and wants different image adjustment for the marking area, the user's desired image adjustment that is different for the marking area from areas other than the marking area cannot be performed.

SUMMARY

An image processing device disclosed in the application includes an image acquisition part acquiring first image data, a character detector detecting, based on the first image data, data of a character area in the first image data, a marking detector detecting, based on the first image data, data of a marking area in the first image data, an image adjustment area determination part determining, based on a detection result of the character detector and a detection result of the marking detector, data of an image adjustment area in the first image data, and an image processing part subjecting the data of the image adjustment area in the first image data to image processing to output second image data.

According to one embodiments of the present invention, when a user wants to perform image adjustment with respect to image processing for a marking area (specific area) in a sheet, the user's desired image adjustment is to be performed only for a specific marking area (weak marking area for example). On the other hand, another image adjustment is to be performed for areas other than the specific marking area (strong marking area for example). Thereby, any image adjustment may be not to be performed for the strong marking area.

BRIEF DESCRIPTION OF THE DRAWINGS

FIGS. 7A and 7B illustrate examples of 3×3 coefficient matrices for Sobel filters for extracting concentration differences used in the processing of FIG. 6.

FIG. 14 illustrates another example of the original document 22 in which character areas and marking areas are mixed.

DETAILED DESCRIPTION

Mode for carrying the present invention will be clear by reading the following description of preferred embodiments with reference to the accompanying drawings. However, the drawings are only for the purpose of illustration and are not intended to limit the scope of the present invention.

First Embodiment

Configuration of First Embodiment

Figure 2:
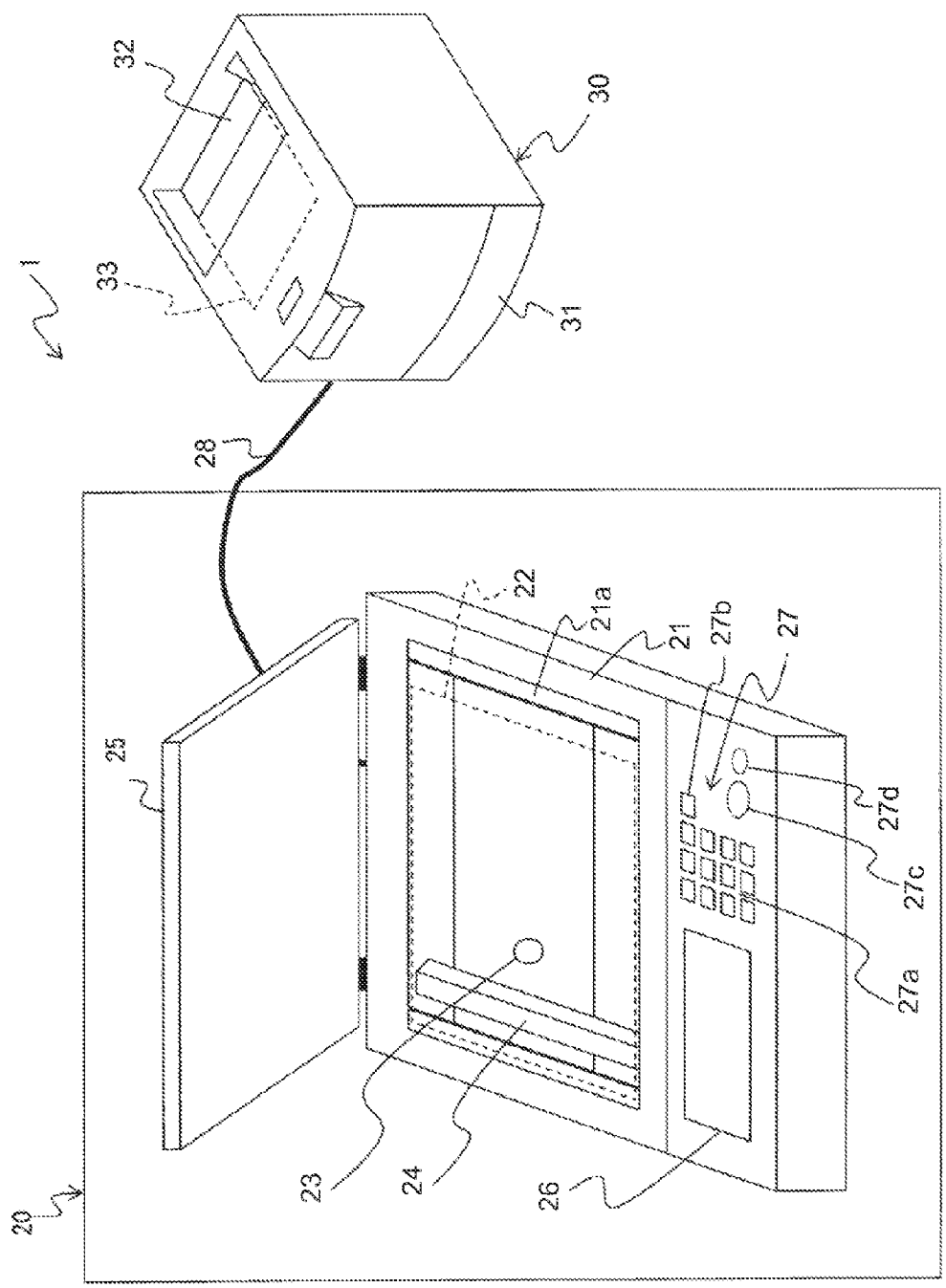
FIG. 2 is an external view illustrating outlines of the image forming device 1 and the image reading device 20 in a first embodiment of the present invention.

FIG. 2 is an external view illustrating outlines of an image forming device 1 and an image reading device 20 (as an image acquisition device) in a first embodiment of the present invention.

The image forming device 1 is configured by communicatively connecting, via a communication cable 28, the image reading device 20 that reads an image from an original document 22 to output image data and an image forming part 30 that forms an image on a recording medium 33 such as paper based on the image data output by the image reading device 20. The image reading device 20 is, for example, a scanner, and the image forming part 30 is, for example, a printer or a display.

The image reading device 20 has a mounting table 21 for mounting the original document 22. A transparent plate 21a made of glass or the like that transmits light is fitted in the mounting table 21. An original document detection sensor 23 and an image sensor 24 are provided inside the transparent plate 21a, the original document detection sensor 23 detecting that the original document 22 is mounted on the mounting table 21, and the image sensor 24, as an image reading means, scanning the original document 22 mounted on the mounting table 21 and converting an image printed on the original document 22 to an electrical signal to obtain image data. The transparent plate 21a is generally formed of glass. However, the transparent plate 21a may also be formed of a material other than glass as long as the material is transparent and does not affect read image quality and has enough strength.

The original document detection sensor 23 detects that the original document 22 is mounted on the mounting table 21, and notifies a main controller 40 (illustrated in FIG. 1) the presence or absence of the original document 22. Detection methods that the original document detection sensor 23 can adopt include a method that uses a mechanical switch (that is, a method in which, when the original document 22 overlays on top of the sensor, the original document 22 is detected due to that the switch is depressed by the weight of the original document 22), a method that uses a light reflective element (that is, a method in which, when the original document 22 overlays on top of the sensor, the original document 22 is detected due to that light is blocked by the original document 22), and the like. However, as long as the presence of the original document 22 can be detected, the type of the sensor does not matter.

Various known methods can be adopted as methods for reading image data from the original document 22 by the image sensor 24. Examples of the known methods include a method in which the original document 22 is placed on the mounting table 21 and a contact-type boundary-line image sensor is driven for reading, or a method in which a Charge Coupled Device (CCD) image sensor is driven for reading, and the like.

A mounting table cover 25 for pressing the original document 22 is openably and closably provided on the mounting table 21. The mounting table cover 25 functions to cover over the mounting table 21 to block environmental light from outside when the image sensor 24 reads the original document 22.

A display 26 that is formed of a display panel, for example, and an operation part 27 are provided in front of the mounting table 22. The display 26 displays an internal state, an operation guide and the like of the image reading device, and is formed of, for example, a liquid crystal, an organic LE and the like. The operation part 27 is for performing operations of start and stop of a reading operation and setting of reading information, and includes a numerical keypad 27a, operation buttons 27b, a color start button 27c, a black-and-white start button 27d, and the like.

The image forming part 30 is provided with a tray 31 storing the recording medium 33 such as a plurality of sheets of paper, and a printed paper discharge part 32 discharging the recording medium 33 on which an image is formed.

Figure 1:
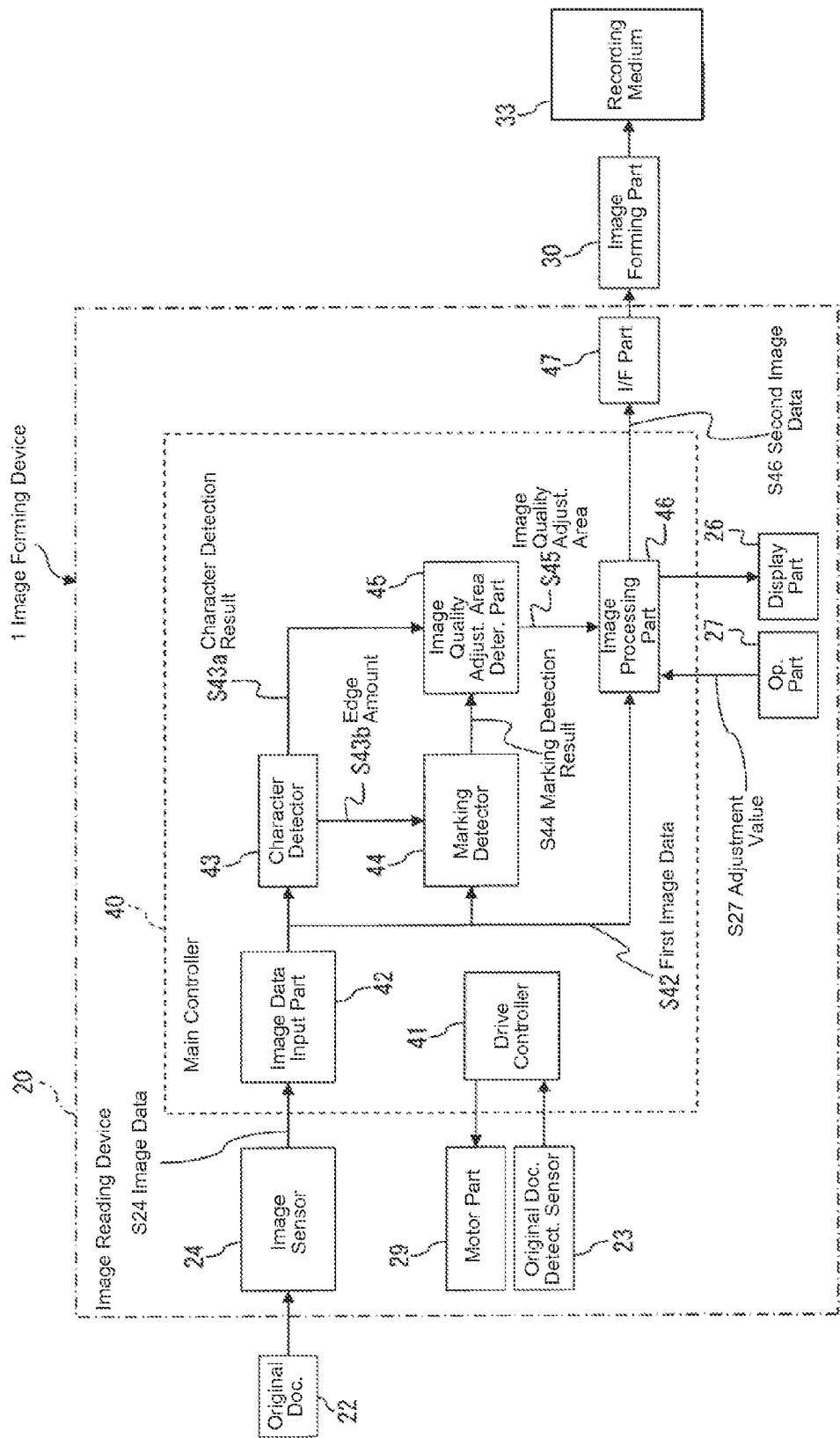
FIG. 1 is a block diagram illustrating outlines of configurations of an image forming device 1 and an image reading device 20 that are illustrated in FIG. 2.

FIG. 1 is a block diagram illustrating outlines of configurations of the image forming device 1 and the image reading device 20 that are illustrated in FIG. 2.

The image reading device 20 is configured by mutually connecting the original document detection sensor 23, the image sensor 24, the display 26, the operation part 27, a motor part 29 and an interface part (referred to as "I/F part" in the following) 47 with the main controller 40. The operation part 27 has a function of receiving an adjustment value S27 for the main controller 40. The motor part 29 is a driving part for moving the image sensor 24 when reading of the original document 22 is performed. The I/F part 47 is used for connecting, via the communication cable 28, with an external device such as the image forming part 30. The image data is transferred via the I/F part 47 to the image forming part 30.

Examples of the I/F part 47 as a common interface include Universal Serial Bus (USB), the Institute of Electrical and Electronic Engineers (IEEE) 1394, Ethernet (registered trademark), wireless LAN, and the like. When data is wirelessly exchanged with an external device, the communication cable 28 is not needed.

The main controller 40 controls the whole image reading device 20 and includes a drive controller 41, an image data input part 42, a character detector 43, a marking detector 44, an image adjustment area determination part 45 and an image processing part 46.

The main controller 40 includes a flash memory, a random access memory (RAM), a program read only memory (PROM), and a central processing unit (CPU). The flash memory is a nonvolatile memory storing correction processing content with respect to image data S24 obtained by the image sensor 24. The RAM is a volatile memory strong the image data S24 obtained by the image sensor 24 and the like.

The PROM is a read-only memory storing various control programs for controls such as image reading control of the image sensor 24 and reading/writing control from/to the flash memory or the RAM. The main controller 40 controls the image reading device 20 by using the CPU to execute programs stored in the PROM. Parts inside the main controller 40 are mutually connected via a bus (not illustrated in the drawings).

When a notification for the presence of the original document 22 is received from the original document detection sensor 23, the drive controller 41 drives the motor part 29 to cause the image sensor 24 to perform a scanning operation.

The image data input part 42 reads in the image data S24 that is read by the image sensor 24 from the original document 22 and outputs first image data S42 to the character detector 43, the marking detector 44 and the image processing part 46.

The character detector 43 determines whether or not each pixel of the first image data S42 input from the image data input part 42 is character data. Further, the character detector 43 calculates an edge amount S43b that indicates a level of an edge, and determines that the pixel of the first image data S42 is a piece of character data (or within the character area) when the calculated edge amount S43b is greater than a certain threshold. Whether or not all pixels of the first image data S42 are character data is detected and a character detection result S43a is output to the image adjustment area determination part 45. Further, the calculated edge amount S43b is output to the marking detector 44.

The marking detector 44 determines, by using the edge amount S43b input from the character detector 43 and the like, whether or not each pixel in the first image data S42 input from the image data input part 42 is data of a marking area. The marking detector 44 detects whether or not each of all pixels of the first image data S42 is data of a marking area and outputs a marking detection result S44 to the image adjustment area determination part 45.

Based on the character detection result S43a input from the character detector 43 and the marking detection result S44 input from the marking detector 44, the image adjustment area determination part 45 determines, with respect to all pixels in the first image data S42, whether or not the data is data of an area subjected to image processing, determines data S45 of an image adjustment target area in the first image data S42, and outputs the determined data S45 of the image adjustment area to the image processing part 46.

Based on the data S45 of the image adjustment area that is input from the image adjustment area determination part 45, the image processing part 46 executes image processing, with respect to the first image data S42 input from the image data input part 42, for performing image adjustment of the adjustment value S27 specified by a user using the operation part 27. Second image data S46 obtained by subjecting the data S45 of the image adjustment area in the first image data S42 to image processing is output to an external device such as the image forming part 30.

The second image data S46 output from the I/F part 47 of the image reading device 20 is output via the communication cable 28 to the image forming part 30.

Figure 3:
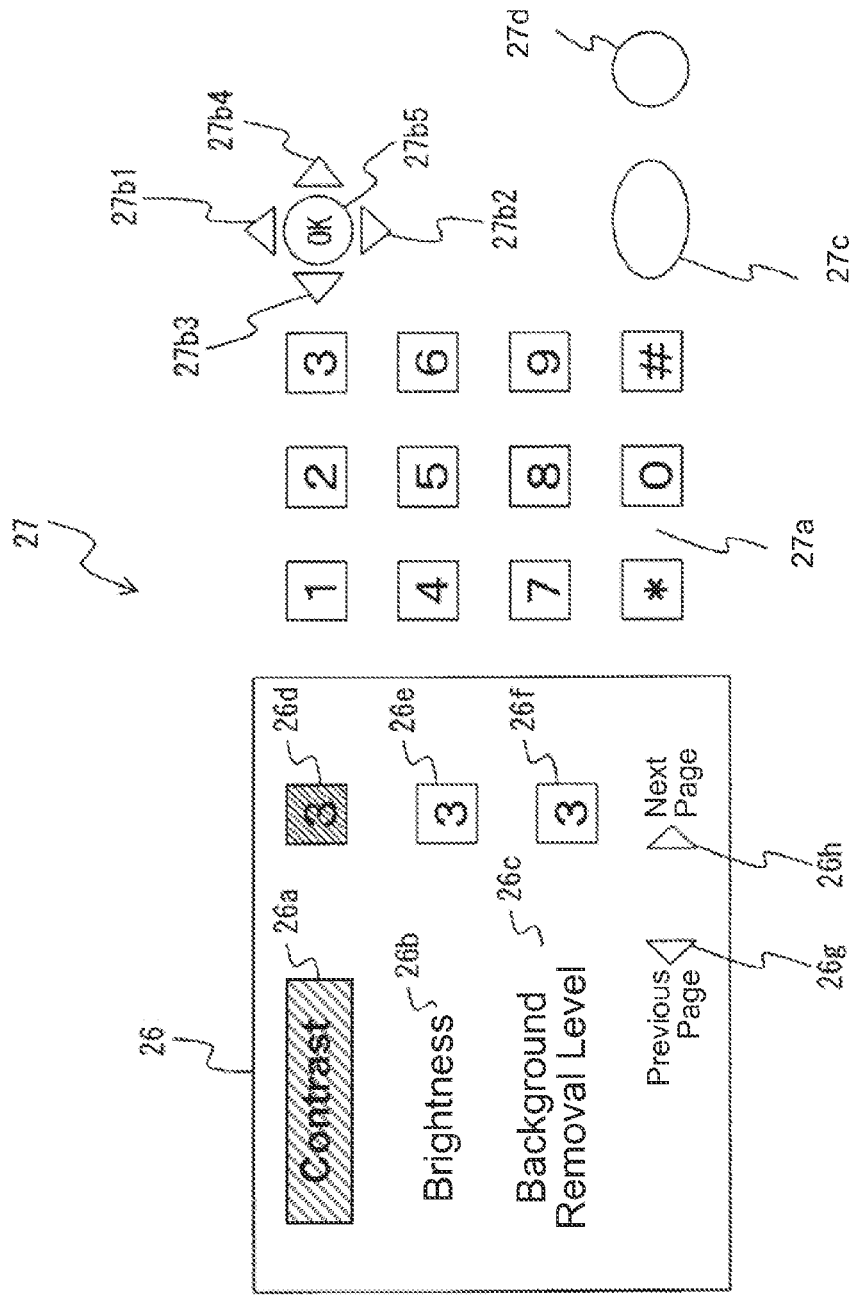
FIG. 3 illustrates examples of a display 26 and an operation part 27 that are illustrated in FIG. 2.

FIG. 3 illustrates examples of the display 26 and the operation part 27 that are illustrated in FIG. 2. In the display 26, settings for contrast 26a, brightness 26b and a background removal level 26c are displayed, and areas 26d, 26e, 26f indicating levels of the contrast 26a, the brightness 26b and the background removal level 26c are respectively provided in areas to the right of the contrast 26a, the brightness 26b and the background removal level 26c. Further, below the setting of the background removal level 26c and its level display area 26f, settings of previous page 26g and next page 26h are respectively displayed.

In the display 26 illustrated in FIG. 3, "3" is specified in the area 26d that indicates the level of the contrast 26a.

To the right of the display 26, the operation part 27 is provided that receives the adjustment value S27 for adjusting the image processing of the image adjustment area S45. The numerical keypad 27a that is used to input a value of a level by pressing a number key is provided in the operation part 27. The operation buttons 27b are provided in an upper portion to the right of the numerical keypad 27a. The operation buttons 27b include four triangular keys 27b1-27b4 and an OK key 27b5 located at the center of the four triangular keys 27b1-27b4. The four triangular keys 27b1-27b4 are an upper triangular key 27b1 having an apex of an isosceles triangle facing upward, a lower triangular key 27b2 having an apex of an isosceles triangle facing downward, a left triangular key 27b3 having an apex of an isosceles triangle facing leftward, and a right triangular key 27b4 having an apex of an isosceles triangle facing rightward. The four triangular keys 27b1-27b4 are operation buttons for selecting an item on the display 26. The OK button 27b5 is an operation button that is pressed when an item on the display 26 is selected and a level that is input with respect to the selected item is determined.

Further, the color start button 27c for instructing to start reading a color original document and the black-and-white start button 27 for instructing to start reading a black-and-white original document are provided in a lower portion to the right of the numerical keypad 27a.

Operation of First Embodiment

First, before a processing of the image reading device 20 is described, as a prerequisite to the processing, the original document 22 in which character areas and marking areas are mixed is described.

Figure 4:
FIG. 4 illustrates an example of an original document 22 in which character areas and marking areas are mixed.

FIG. 4 illustrates an example of the original document 22 in which character areas and marking areas are mixed. "ABCDE" of a character area S43a1, "FGHIJ" of a character area S43a2, "KLMNO" of a character area S43a3, "PQRST" of a character area S43a4, "UVWXY" of a character area S43a5 and "Zabcd" of a character area S43a6 are illustrated in FIG. 4. The character areas in the application are defined as blackened areas by letters. Although only "A, F, K, P, U, and Z" are referred with numerals S43a1 to S43a6 in FIG. 4, each of letters in FIG. 4 form the character areas. As a general reference, the character areas are referred with S43a. The marking areas are defined as areas that a user puts marks (or hatching) on the sheet before the sheet is read. When the user makes a blacked grid in a sheet for other people not reading letters behind the grid, the grid means a marking area. When a user put highlight or hatching on a sheet, the highlighted area or hatched area is the marking area. The marking area is referred with S44. Dark hatching areas (or strong marking area) are with S44a. Light hatching area (or weak marking area) is with S44b.

Among these character areas, character areas of "ABCDE" of the character area S43a1, "PQRST" of the character area S43a4 and "UVWXY" of the character area S43a5 are not marked from above of the character areas S43a.

In "FGHIJ" of the character area S43a2 and "Zabcd" of the character area S43a6, marking areas S44a of filling with the dark hatchings that respectively obscure the characters "GHI" and "abc" are applied. The characters "GHI" of the character area S43a2 and "abc" of the character area S43a6 are covered by the strong marking areas S44a and are areas where character information cannot be visually read. However, although the character information cannot be read as is in these areas, there are slight brightness differences between the marking areas S44 and the character areas S43a. Due to the brightness differences, these hidden letters might be shown after a type of contrast processing is performed on the letters.

Further, in "KLMNO" of the character area S43a3, a weak marking area S44b is applied on a character area of characters "LMN." Although the characters "LMN" are covered by marking, brightness difference between the characters "KLMNO" of the character area S43a3 and the marking area of the "LMN" portion is large. Therefore, character information can be read in the marking area without contrast processing being performed.

Next, with respect to the original document 22 illustrated in FIG. 4, an overall processing of the image s reading device 20 in FIG. 1 is described.

Figure 5:
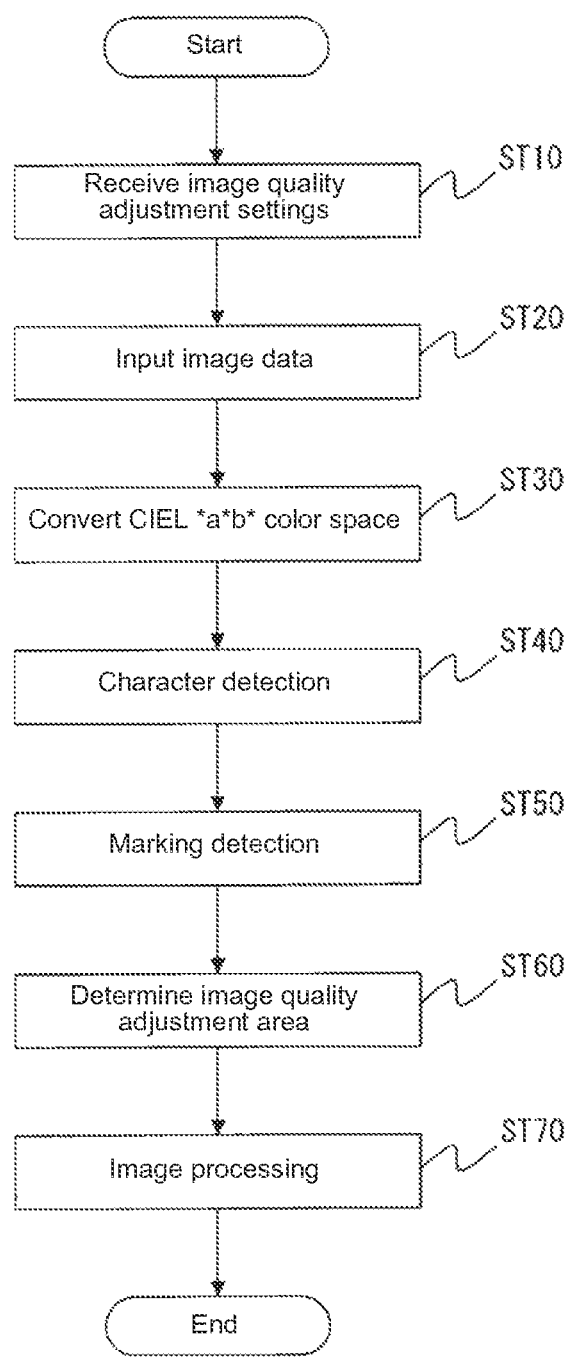
FIG. 5 is a flow diagram illustrating an overall processing of the image reading device 20 in FIG. 1.

FIG. 5 is a flow diagram illustrating an overall processing of the image reading device 20 illustrated in FIG. 1. When the processing of the image reading device 20 in FIG. 1 is started, the processing proceeds to ST10. At ST10, when the presence of the original document 22 on the mounting table 21 of the image reading device 20 is detected by the original document detection sensor 23, a reading condition for image quality of the original document 22 is displayed in the display 26. The operation part 27 receives an operation from a user, determines a user-specified setting for image adjustment during reading, and keeps the determined setting for image adjustment in the RAM (not illustrated in the drawings). When a setting for image adjustment is not specified by a user, a setting for image adjustment that the reading device 20 keeps in advance is kept in the RAM (not illustrated in the drawings).

In FIG. 3, setting items including the contrast 26a, the brightness 26b and the background removal level 26c are displayed in the display 26. In the example of FIG. 3, the level of each of the setting items is "3." Further, in the display 26, "3" for the level of the contrast 26a is specified and the level can be adjusted by pressing the numerical keypad 27a. By pressing the lower triangular key 27b2 and the upper triangular key 27b1, a state in which the contrast 26a is specified is changed to a state in which the brightness 26b or the background removal level 26c is specified. Further, by pressing the right triangular key 27b4, the next page 26h of a user-specified image adjustment setting screen is selected and, by pressing the left triangular key 27b3, the previous page 26g is selected. Thereby, image adjustment items can be selected. When settings for all image adjustment items are completed, by pressing the OK button 27b5 in FIG. 3, the setting for image adjustment is completed, and the processing proceeds to ST20.

At ST20, when that the color start button 27c or the black-and-white start button 27d is pressed is detected, the image data input part 42 drives the motor part 29 to cause the image sensor 24 to perform a scanning operation to read the original document 22 mounted on the mounting table 21 to obtain the first image data S42, and the processing proceeds to ST30.

At ST30, the image data input part 42 converts an expression color space to a CIEL*a*b* color space with respect to all pixels of the image data S24, and the processing proceeds to ST40. Conversion from the expression color space to the CIEL*a*b* color space is performed using a commonly known conversion method.

At ST40, the character detector 43 detects, with respect to each pixel of the first image data S42 obtained at ST20, whether or not the pixel is for character data and outputs the character detection result S43a, and the processing proceeds to ST50.

At ST50, the marking detector 44 detects, with respect to each pixel of the first image data S42 obtained at ST20, whether or not the pixel is marked and outputs the marking detection result S44, and the processing proceeds to ST60.

At ST60, based on the character detection result S43a obtained at ST40 and the marking detection result S44 obtained at ST50, the image adjustment area determination part 45 determines an image adjustment area S45 and a non-image adjustment area /S45 (here, "/S45" means an area other than the image adjustment area S45 in the original document 22 or the recording medium 33), and the processing proceeds to ST70. When a weak marking area includes a character area, the marking area is determined as an image adjustment area because there is a large brightness difference between the character area and the marking area. When a strong marking area includes a character area, the marking area is determined as a non-image adjustment area because there is a small brigthtness differences between the character area and the marking area.

At ST70, based on the image adjustment area S45 determined at ST60, the image processing part 46 performs, with respect to the first image data S42 obtained at ST20, image processing for the image adjustment specified at ST10 by the user. When an attention pixel is in the image adjustment area S45, the attention pixel is subjected to image processing for the image adjustment specified at ST10 by the user. When the attention pixel is in the non-image adjustment area /S45, the attention pixel is not subjected to image processing.

Regarding image processing with respect to the non-image adjustment area /S45, in the above, it is mentioned that the non-image adjustment area /S45 is not subjected to image processing. However, it is not limited to this. With respect to the non-image adjustment area /S45, image processing in which the area is filled in black, image processing in which the area is filled in white to become a blank area, and the like are possible.

Figure 6:
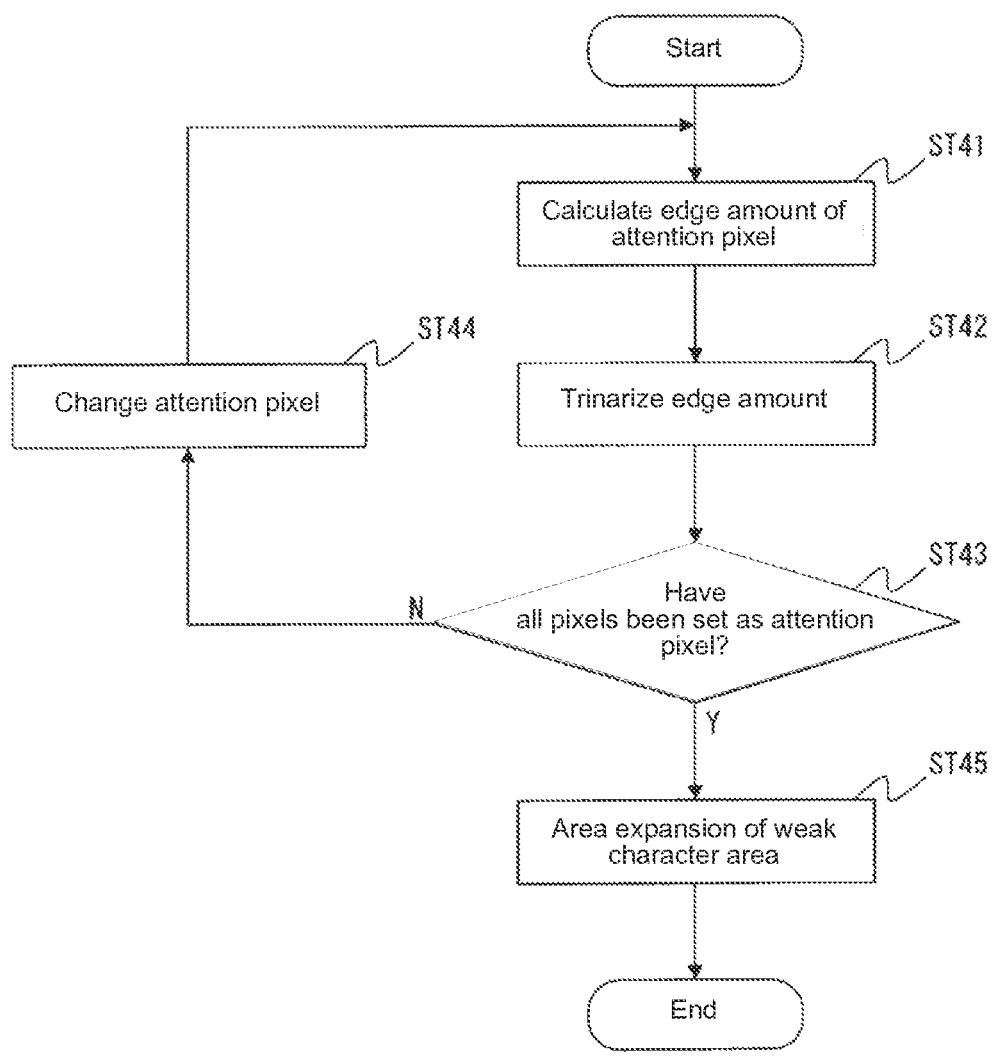
FIG. 6 is a flow diagram illustrating a processing of a character detector 43 in FIG. 1.
Figures 7A, 7B:
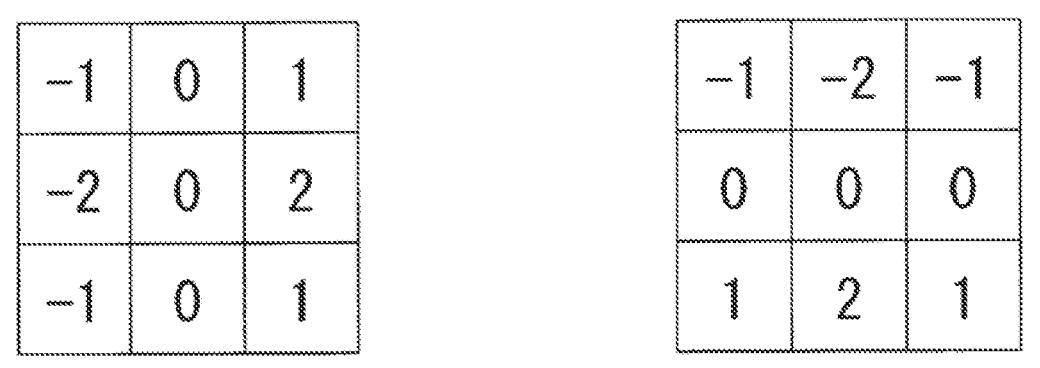

FIG. 6 is a flow diagram illustrating a processing of the character detector 43 in FIG. 1. FIGS. 7A and 7B illustrate examples of 3×3 coefficient matrices for Sobel filters for extracting concentration differences used in the processing of FIG. 6. FIG. 7A illustrates a Sobel filter that is used when extracting a concentration difference E_v in a vertical direction. FIG. 7B illustrates a Sobel filter that is used when extracting a concentration difference E_h in a horizontal direction.

When the processing of the character detector 43 is started, the processing proceeds to ST4. At ST41, at an attention pixel, an edge amount E is calculated by a filtering process according to an L* value of the attention pixel obtained at ST30 and a commonly known 3×3 Sobel filter.

The edge amount E is calculated according to Equation (1) using values the two kinds of concentration differences of the coefficient matrices, and the processing proceeds to ST42.

$$E = E\_v^2 + E\_h^2 \quad (1)$$

At ST42, trinarization is performed with respect to the edge amount E obtained at ST41. The trinarization is performed according to Equation (2) using predetermined thresholds TH_H and TH_L (where TH_H>TH_L), and the processing proceeds to ST43.

$$\begin{cases} E = 2 & \text{for TH\_H} \le E \\ E = 1 & \text{for TH\_L} \le E < \text{TH\_H} \\ E = 0 & \text{for } E < \text{TH\_L} \end{cases} \quad (2)$$

Here, the attention pixel is for a strong character when E=2, a weak character when E=1, and a non-character when E=0. Further, a result of the trinarized edge amount E is stored in the RAM (not illustrated in the drawings).

For example, in FIG. 4, "ABCDE" of the character area S43a1, "F J" of the character area S43a2 and "K O" of the character area S43a3, "Z d" of the character area S43a6, which are not covered with the marking areas S44a and S44b, are strong characters (E=2). "GHI" of the character area S43a2, "LMN" of the character area S43a2 and "abc" of the character area S43a6, which are covered by either the marking areas S44a or the marking area S44b, are weak characters (E=1). Of the marking areas S44a and S44b, the remaining areas, which are not overlapped with the character areas S43a, are non-character areas (E=0).

At ST43, whether all pixels of the first image data S42 obtained at ST20 have been set as an attention pixel is determined. When there remains a pixel that has not been set as an attention pixel (N), the processing proceeds to ST44. At ST44, a pixel that has not been set as an attention pixel is set as an attention pixel, and the processing returns to ST41. Until it is determined at ST43 that all pixels have been set as an attention pixel (Y), the processing of ST41-ST44 is repeated. When it is determined at ST43 that all pixels have been set as an attention pixel (Y), the processing proceeds to ST45.

At ST45, area expansion of a weak character area is performed. Not only an edge of a weak character, the interior of the weak character is also detected as a weak character area. In the area expansion, surrounding pixels in eight directions of a pixel that is determined as a weak character area are explored. With respect to the eight surrounding pixels, whether or not each of the eight surrounding pixels is a weak character area is determined. A method for determining whether or not a pixel is a weak character area is as follows. An average value of brightness in a 5×5 pixel block around an attention pixel is calculated. A value obtained by adding a predetermined value TH_f to the calculated average value is compared with a brightness value of the attention pixel. When the brightness value of the attention pixel is lower than the average value of brightness, the attention pixel is set as a weak character area. Namely, the average value of brightness is a threshold value. Further, the weak character area determination is also similarly performed with respect to surrounding eight pixels of the attention pixel.

In the above embodiment, a 5×5 pixel block around an attention pixel is used for the area expansion. However, the processing of the area expansion of a weak character area is not limited to using a 5×5 pixel block around an attention pixel. A pixel block of any shape such as a 7×7 pixel block or a 3×5 pixel block may also be used. Further, for a pixel that is determined to be a weak character area, the edge amount E obtained at ST42 is set to be E=1, and for a pixel that is determined to be not a weak character area, the edge amount E is set to be E=0.

Figure 8:
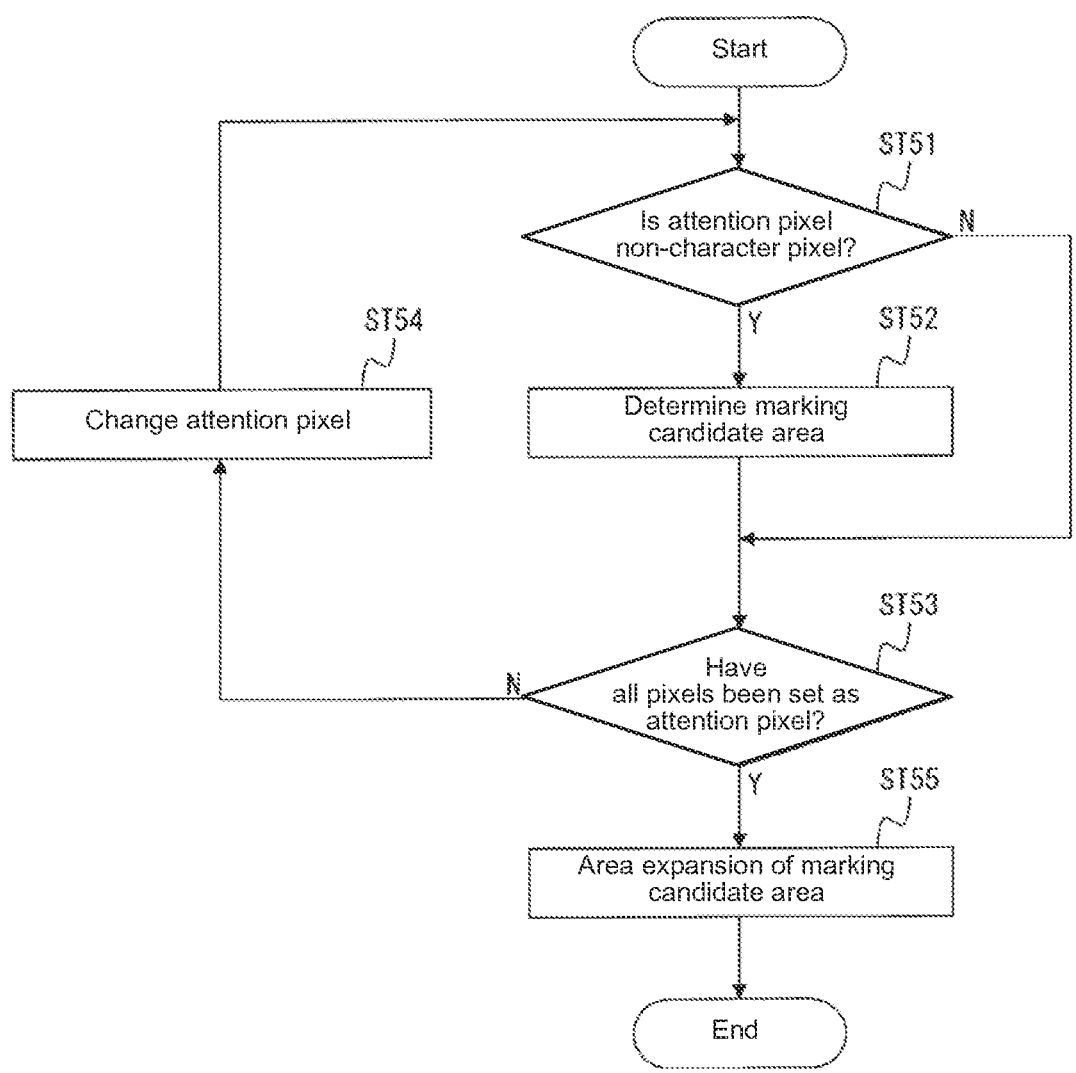
FIG. 8 is a flow diagram illustrating a processing of a marking detector 44 in FIG. 1.

FIG. 8 is a flow diagram illustrating a processing of the marking detector 44 in FIG. 1. When the processing of the marking detector 44 is started, the processing proceeds to ST51. At ST51, at an attention pixel, whether the attention pixel is non-character is determined. Here, a non-character means that the edge amount E obtained at ST45 is E=0. When the attention pixel is non-character (E=0) (Y), the processing proceeds to ST52. When the attention pixel is not a non-character (E≠0: E=1 or E=2) (N), the processing proceeds to ST53.

At ST52, at an attention pixel, whether or not the attention pixel is a marking candidate area is determined The L* value of the attention pixel obtained at ST30 is compared with a predetermined threshold. When the L* value is lower than the predetermined threshold, the attention pixel is set to be a marking candidate area. When the L* value is higher than the predetermined threshold, the attention pixel is set to be a non-marking candidate area.

In FIG. 4, the interior of "GHI" of the marking area S44*a* and the "LMN" portion of the marking area S44*b* are marking candidate areas and other areas are non-marking candidate areas.

At ST53, whether all pixels of the first image data S42 obtained at ST20 have been set as an attention pixel is determined. When there remains a pixel that has not been set as an attention pixel (N), the processing proceeds to ST54. At ST54, a pixel that has not been set as an attention pixel is set as an attention pixel, and the processing returns to ST51. Until it is determined at ST53 that all pixels have been set as an attention pixel, the processing of ST51-ST54 is repeated. When it is determined at ST53 that all pixels have been set as an attention pixel (Y), the processing proceeds to ST55.

At ST55, area expansion of a marking candidate area is performed and a marking area is determined. The area expansion is performed as follow. Pixels that are marking candidate areas in a 5×5 pixel block around an attention pixel are counted. The number of pixels that are marking candidate areas in the 5×5 pixel block is compared with a predetermined threshold. When the number of pixels that are marking candidate areas in the 5×5 pixel block is higher than the predetermined threshold, the attention pixel is set to be a marking area. When the number of pixels that are marking candidate areas in the 5×5 pixel block is lower than the predetermined threshold, the attention pixel is set to be a non-marking area.

In the above first embodiment, a 5×5 pixel block around an attention pixel is used for the area expansion. However, the shape of the pixel block is not limited to 5×5. A pixel block of 7×7 or 3×5, or the like may also be used.

Whether or not a pixel is a marking area is determined with respect to all pixels of the first image data S42 obtained at ST20. The processing of ST50 ends once the marking area determination with respect to all the pixels ends.

A marking area is determined by performing area expansion of a marking candidate area. Thereby, in FIG. 4, the "GHI" portion of "FGHIJ" of the character area S43*a*2 and the "LMN" portion of "KLMNO" of the character area S43*a*3 become respectively the marking area S44*a* and the marking area S44*b*.

Figure 9:
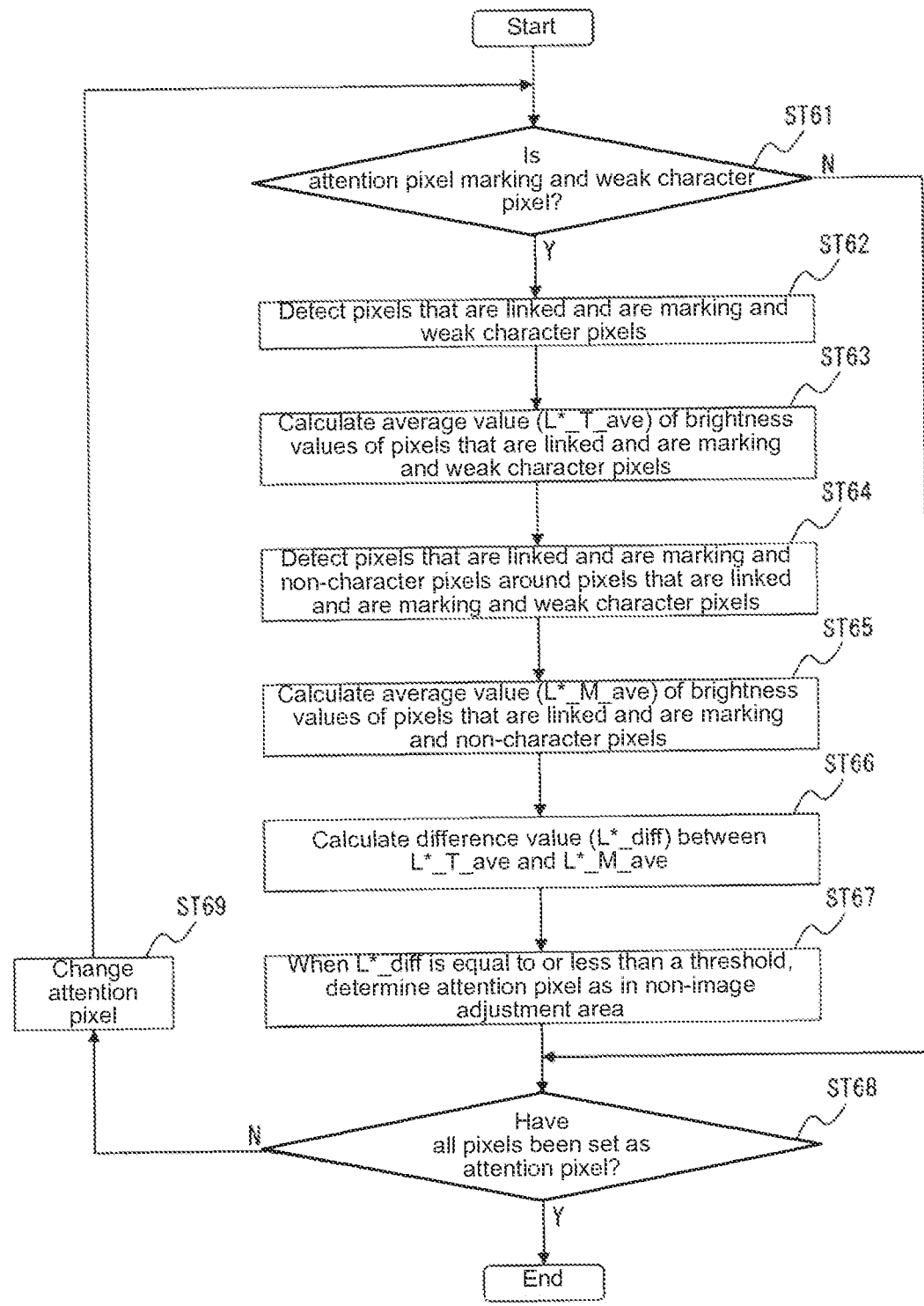
FIG. 9 is a flow diagram illustrating a processing of an image adjustment area determination part 45 in FIG. 1.

FIG. 9 is a flow diagram illustrating a processing of the image adjustment area determination part 45 in FIG. 1. When the processing of the image adjustment area determination part 45 is started, the processing proceeds to ST61. At ST61, whether or not an attention pixel is a marking and weak character pixel is determined. When the attention pixel is a marking and weak character pixel (Y), the processing proceeds to ST62. When the attention pixel is not a marking pixel or is not a weak character pixel (N), the processing proceeds to ST68. For example, pixels that are marking and weak character pixels mean pixels forming "GHI" covered by the marking area S44*a* in FIG. 4.

At ST62, pixels that are marking and weak character pixels and are linked to the attention pixel that is a marking and weak character pixel are detected. Eight directions of the attention pixel that is a marking and weak character pixel are explored. With respect to eight surrounding pixels of the attention pixel, whether each of the eight pixels is a marking and weak character pixel is determined. When there is no pixel that is a marking and weak character pixel among the eight surrounding pixels of the attention pixel, the detection of pixels that are marking and weak character pixels and are linked to the attention pixel ends.

When there is a pixel that is a marking and weak character pixel among the eight surrounding pixels of the attention pixel, further, the surrounding pixel that is a marking and weak character pixel is set as an attention pixel and eight directions thereof are explored, and whether each of eight surrounding pixels is a marking and weak character pixel is determined. Until detection of linked marking and weak character pixels ends, exploration of surrounding pixels is repeated to detect pixels that are inked and are marking and weak character pixels. Here, pixels that are linked and are marking and weak character pixels mean, for example, the entire characters "GHI" in FIG. 4, that is, the character area covered by marking.

At ST63, an average value L*_T_ave of L* values of the pixels obtained at ST62 that are linked and are marking and weak character pixels is calculated, and the processing proceeds to ST64. At ST64, with respect to all the pixels obtained at ST62 that are linked and are marking and weak character pixels, pixels that are linked and are marking and non-character pixels are detected. Eight directions of all the pixels obtained at ST62 that are marking and weak character pixels are explored and whether each of eight surrounding pixels is a marking and non-character pixel is determined. When there is a pixel that is a marking and non-character pixel among the eight surrounding pixels, further, eight directions of the pixel that is a marking and non-character pixel are explored, and whether each of eight surrounding pixels is a marking and non-character pixel is determined. This is repeated. When there is no pixel among the eight surrounding pixels that is a marking and non-character pixel, the detection of pixels that are marking and non-character pixels ends.

Pixels that are linked marking and non-character pixels mean remaining pixels of marking areas S44*a* and S44*b* from which characters pixels have been eliminated. For example, in FIG. 4, of the marking areas S44*a* of "GHI," an area which is not overlapped with characters "GHI" is defined as a linked marking and non-character area. Pixels of the area is the linked marking and non-character pixels.

At ST65, an average value L*_M_ave of L* values of pixels obtained at ST64 that are linked and are marking and non-character pixels is calculated, and the processing proceeds to ST66. At ST66, a difference value L*_diff between L*_T_ave obtained at ST63 and L*_M_ave obtained at ST65 is calculated, and the processing proceeds to ST67. At ST67, the difference value L*_diff obtained at ST66 is compared with a predetermined threshold. When the difference value L*_diff is equal to or lower than the predetermined threshold, the pixels obtained at ST62 that are linked and are marking and weak character pixels and the pixels obtained at ST64 that are marking and non-character pixels are set as non-image adjustment areas.

When the difference value L*_diff is greater than the predetermined threshold, the pixels obtained at ST62 that are linked and are marking and weak character pixels and the pixels obtained at ST64 that are marking and non-character pixels are set as image adjustment areas.

It is desirable that the predetermined threshold for the difference value L*_diff be a value about 10% of a difference between a maximum value and a minimum value of the brightness.

In FIG. 4, the brightness difference between the characters "FGHIJ" of the character area S43a2 and "Zabcd" of the character area S43a6 and the marking areas S44a is small and therefore these areas are non-image adjustment areas. On the other hand, the brightness difference between the characters "KLMNO" of the character area S43a3 and the marking area S44b that is applied to the characters "LMN" portion of the marking area S44b is large and therefore this area is an image adjustment area.

At ST68, whether all pixels of the first image data S42 obtained at ST20 have been set as an attention pixel is determined. When there remains a pixel that has not been set as an attention pixel (N), the processing proceeds to ST69. At ST69, a pixel that has not been set as an attention pixel is set as an attention pixel, and until it is determined at ST68 that all pixels have been set as an attention pixel, the processing of ST61-ST69 is repeated. At ST68, when it is determined that all the pixels have been set as an attention pixel (Y), the processing of the image adjustment area determination part 45 ends.

FIGS. 10A-10D are for describing content of image processing using the image reading device 20 of FIG. 2.

Figure 10A:
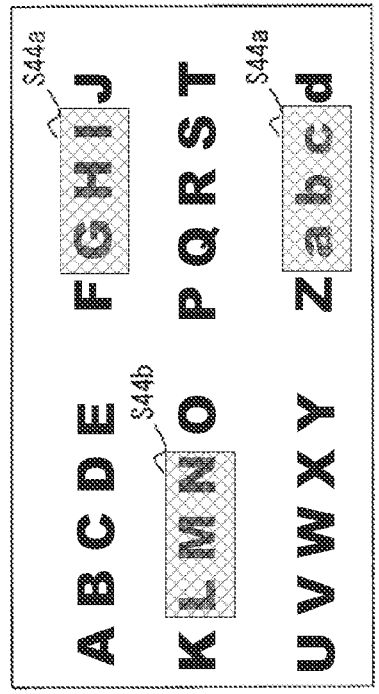
FIGS. 10A-10D illustrate examples of images before and after image processing in the first embodiment of the present invention.
Figure 10B:
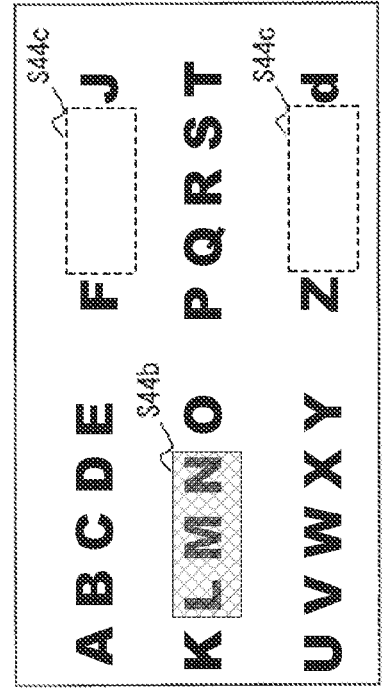
Figure 10C:
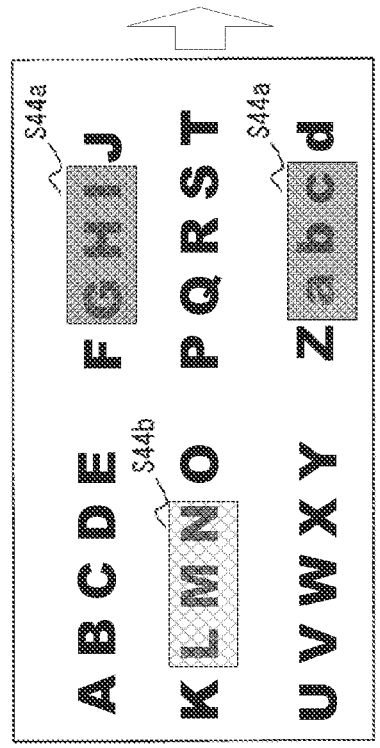
Figure 10D:
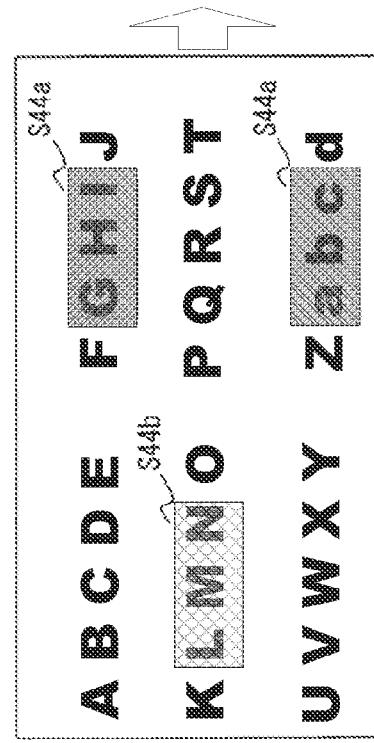

FIG. 10A illustrates an image before image processing. FIG. 10B illustrates an image as a target for comparison that is obtained by performing image processing according to a uniform image adjustment such as contrast adjustment, without performing determination of an image adjustment area. FIG. 10C illustrates an image of a case where an image adjustment area is determined according to the first embodiment and image processing is disabled for a non-image adjustment area. FIG. 10D illustrates an image of a case where an image adjustment area is determined according to the first embodiment and image processing is performed in which a non-image adjustment area is filled in white.

FIG. 10A illustrates an image of the original document 22 before image processing, that is, the image illustrated in FIG. 4. In FIG. 10A, difference between contrasts of the marking area S44a of the "GHI" and "abc" portions and the characters "FGHIJ" of the character area S43a2 and "Zabcd" of the character area S43a6 is small. Therefore, the character portion of "GHI" in "FGHIJ" of the character area S43a2 and the character portion of "abc" in "Zabcd" of the character area S43a6 are obscured by the marking areas S44a and become hidden images.

FIG. 10B illustrates an image after a conventional image processing with uniform contrast, that is, an image of a case where the contrasts of "GHI" and "abc" of the marking areas S44a are set to be equal to the contrast of "LMN" of the marking area S44b. The contrast difference between the marking areas S44a of the "GHI" and "abc" portions and characters "FGHIJ" of the character area S43a2 and "Zabcd" of the character area S43a6 is the same as the contrast difference between the marking area S44b of the "LMN" portion of the marking area S44b and the characters "KLMNO" of the character area S43a3, and the contrast difference is large as compared to that in FIG. 10A. Therefore, characters of the "GHI", "LMN" and "abc" portions of the character areas S43a2, S43a3 and S43a6 in FIG. 4 can be seen through.

For an original document in which a character string in a text is filled in black in order to hide the character string, in the conventional case where the entire original document is subjected to an image processing with uniform contrast adjustment and the like, when the filling in black is insufficient, the information that is to be hidden may be leaked.

FIG. 10C illustrates an image after image processing in the case where image processing is disabled, and is the same as FIG. 10A that illustrates an image of the original document 22 before image processing. It is clear that in the portion of the characters "LMN", the character information that is filled with marking can be recognized. On the other hand, for the characters "GHI" and "abc," the problem like that of the characters "LMN" does not occur and the character information that is filled with marking cannot be read. When there is no difference between the L* value of a marking and weak character pixel and the L* value of a marking and non-character pixel that exists around the marking and weak character pixel, it is determined that the character is hidden by marking, and an adjustment by a user, such as a contrast adjustment, is disabled. Thereby, the hidden character information cannot be read and information leakage can be prevented.

FIG. 10D illustrates an image of the case where image processing is applied in which the non-image adjustment areas are filled in white. The marking areas 44c are portions indicated by rectangles of dashed lines. In practice, the non-image adjustment areas are filled in white, not the dashed lines.

Effect of First Embodiment

According to the image forming device 1 and the image reading device 20 of the first embodiment of the present invention, when reading the original document 22, marking areas on characters can be recognized as either the strong marking area or the weak marking area. Therefore, a user desired special image processing can be easily applied only to the weak marking area so that the characters covered by the weak marking area are printed in a visibly manner. On the other hand, by disabling the image processing requested by the user, the characters covered by the strong marking area are printed to be blackened, whitened, or not be visible. Information of the characters with the strong marking area cannot be read, preventing information leakage.

Second Embodiment

Configuration of Second Embodiment

Figure 11:
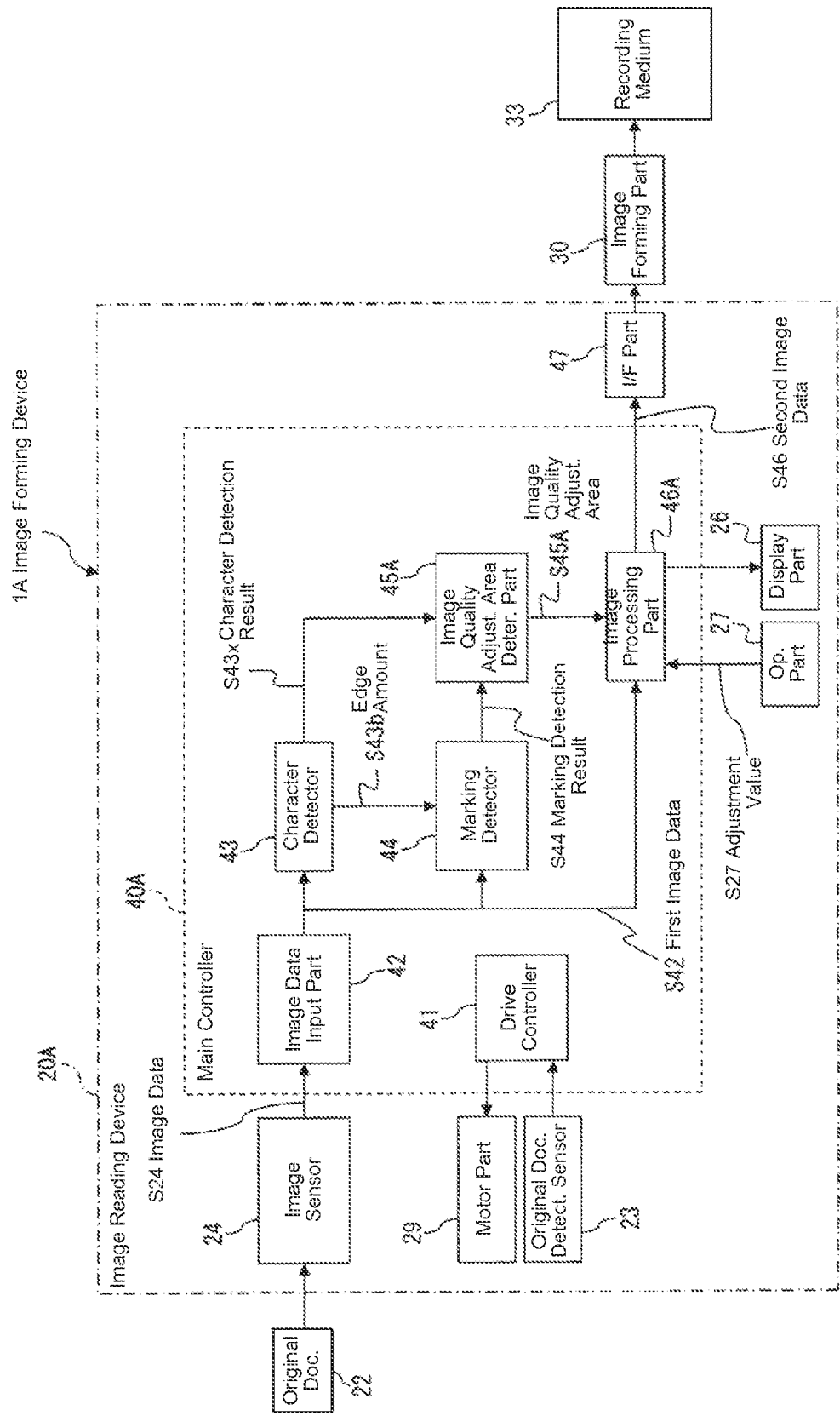
FIG. 11 is a block diagram illustrating outlines of configurations of an image forming device 1A and an image reading device 20A in a second embodiment of the present invention.

FIG. 11 is a block diagram illustrating outlines of configurations of an image forming device 1A and an image reading device 20A in a second embodiment of the present invention. In FIG. 11, elements that are in common with FIG. 1 that illustrates the first embodiment are denoted using common reference numerals.

The image forming device 1A of the second embodiment is configured by communicatively connecting an image reading device 20A and the image forming part 30. The image reading device 20A reads an image from the original document 22 and outputs second image data S46A that is different from the first embodiment. The image forming part 30, which is the same as the first embodiment, forms an image on the recording medium 33 based on the second image data S46A output by the image reading device 20A.

The image reading device 20A includes the original document detection sensor 23, the image sensor 24, the display 26, the operation part 27, the motor part 29, the I/F part 47, and a main controller 40A, the original document detection sensor 23, the image sensor 24, the display 26, the operation part 27, the motor part 29 and the I/F part 47 being the same as the first embodiment, the main controller 40A having a function different from the first embodiment.

The main controller 40A includes the drive controller 41, the image data input part 42, the character detector 43, the marking detector 44, an image adjustment area determination part 45A and an image processing part 46A, the drive controller 41, the image data input part 42, the character detector 43 and the marking detector 44 being the same as the first embodiment, the image adjustment area determination part 45A and the image processing part 46A having functions different from the first embodiment.

Based on a determination result S43x of whether or not each of all pixels in the first image data S42 input from the character detector 43 is a character pixel and a determination result S44 of whether or not each of all pixels in the first image data S42 input from the marking detector 44 is a marked pixel, the image adjustment area determination part 45A determines whether or not each of all pixels in the first image data S42 中 is in an area to be subjected to image processing that is different from the first embodiment and determines an image adjustment area in the first image data S42. The determined image adjustment area is output to the image processing part 46A. The image processing part 46A subjects the first image data S42 to the image processing that is different from the first embodiment and outputs the second image data S46A that is different from the first embodiment.

Operation of Second Embodiment

Figure 12:
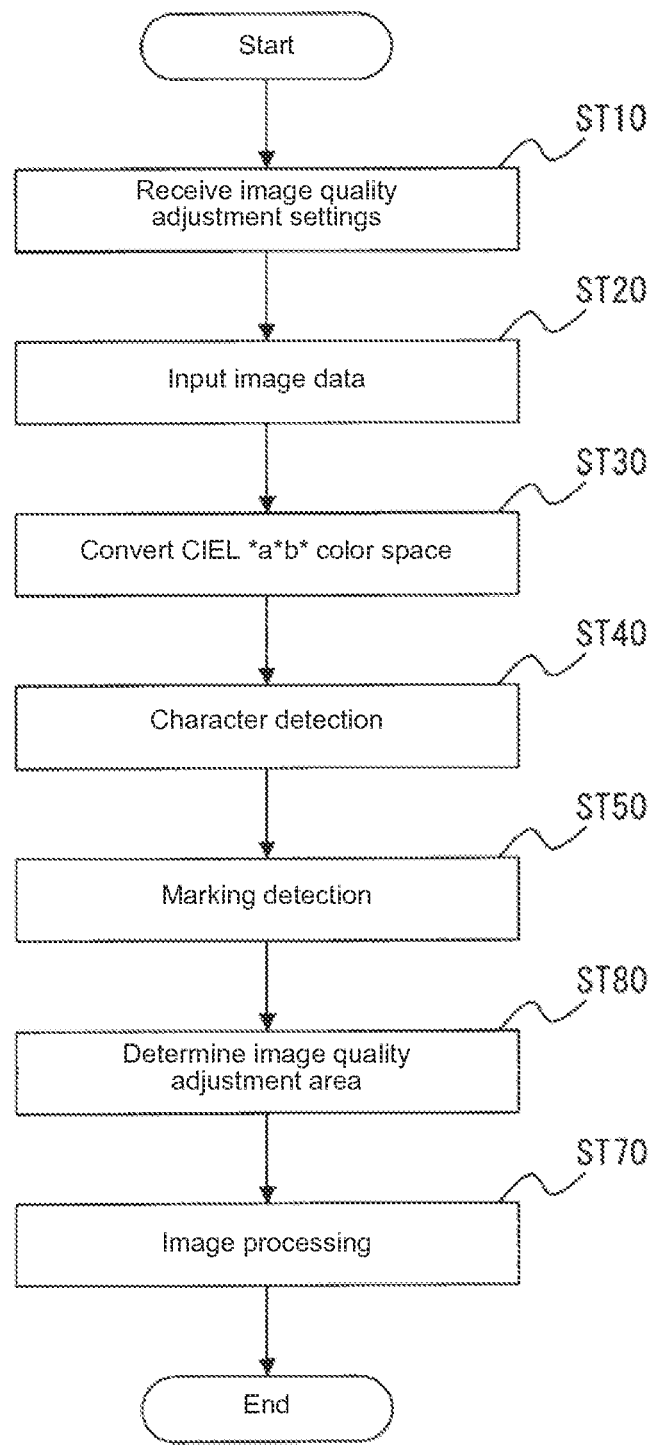
FIG. 12 is a flow diagram illustrating an overall processing of the image reading device 20A in FIG. 11.

FIG. 12 is a flow diagram illustrating an overall processing of the image reading device 20A in FIG. 11. In FIG. 12, elements that are in common with FIG. 5 that illustrates the first embodiment are denoted using common reference numerals. When the processing of the image reading device 20A of the second embodiment is started, the processing proceeds to ST10. The processing of ST10-ST50 that is the same as the first embodiment is performed. When the processing of ST50 ends, the processing proceeds to ST80.

At ST80, according to the character detection result S43a obtained at ST40 and the marking detection result S44 obtained at ST50, the image adjustment area determination part 45A determines an image adjustment area S45A, and the processing proceeds to ST70, at which processing that is the same as the first embodiment is performed.

Figure 13:
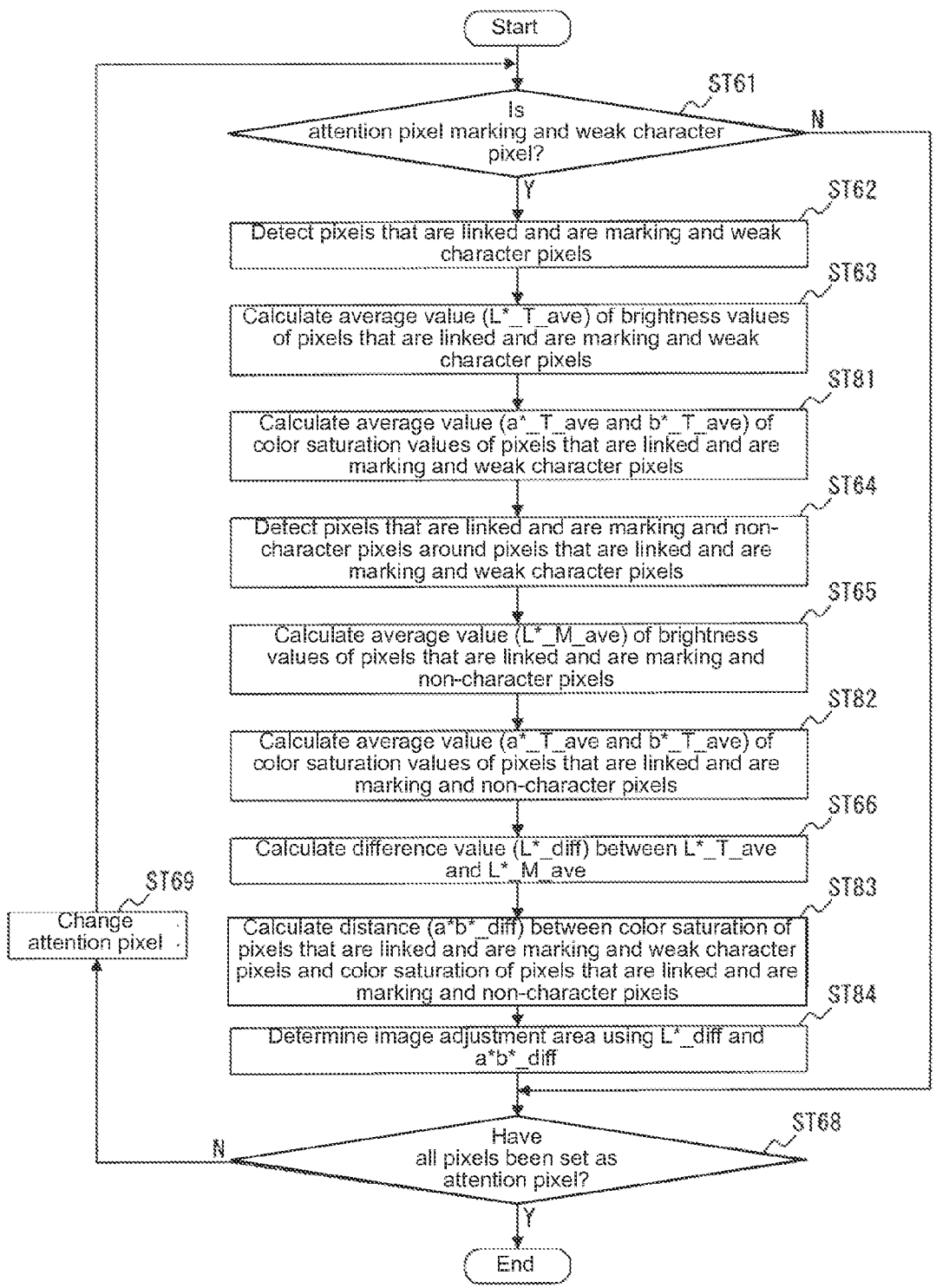
FIG. 13 is a flow diagram illustrating a processing of an image adjustment area determination part 45A in FIG. 11.

FIG. 13 is a flow diagram illustrating a processing of the image adjustment area determination part 45A in FIG. 11. In FIG. 13, elements that are in common with FIG. 9 that illustrates the first embodiment are denoted using common reference numerals.

In the processing of the image adjustment area determination part 45A of the second embodiment, processing of ST81-ST84 is added to the processing of the image adjustment area determination part 45 of the first embodiment illustrated in FIG. 9.

An image adjustment area determination operation is described based on FIG. 13. When the processing of the image adjustment area determination part 45A is started, the processing proceeds to ST61. The processing of ST61-ST63 that is the same as the first embodiment is performed. When the processing of ST63 ends, the processing proceeds to ST81.

At ST81, an average value $a^*\_T\_ave$ of $a^*$ values of pixels obtained at ST62 that are linked and are marking and weak character pixels is calculated. Further, an average value $b^*\_T\_ave$ of $b^*$ values of pixels obtained at ST62 that are linked and are marking and weak character pixels is calculated, and the processing proceeds to ST64. At ST64 and ST65, the processing that is the same as the first embodiment is performed. When the processing of ST65 ends, the processing proceeds to ST82.

At ST82, an average value $a^*\_M\_ave$ of $a^*$ values of pixels obtained at ST64 that are linked and are marking and non-character pixels is calculated. Further, an average value $b^*\_M\_ave$ of $b^*$ values of pixels obtained at ST64 that are linked and are marking and non-character pixels is calculated, and the processing proceeds to ST66. At ST66, the processing that is the same as the first embodiment is performed, and the processing proceeds to ST83.

At ST83, using $a^*\_T\_ave$ and $b^*\_T\_ave$ obtained at ST81 and $a^*\_M\_ave$ and $b^*\_M\_ave$ obtained at ST82, a distance $a^*b^*\_diff$ between color saturation of pixels that are linked and are marking and weak character pixels and color saturation of pixels that are linked and are marking and non-character pixels is calculated, and the processing proceeds to ST84. A method of the calculation is based on Equation (3).

$$a^*b^*\_diff = (a^*\_T\_ave - a^*\_M\_ave)^2 + (b^*\_T\_ave - b^*\_M\_ave)^2 \qquad (3)$$

At ST84, by using $L^*\_diff$ obtained at ST66 and $a^*b^*\_diff$ obtained at ST83, the image adjustment area S45A is determined. When $L^*\_diff$ obtained at ST66 is equal to or lower than a predetermined threshold and $a^*b^*\_diff$ obtained at ST83 is equal to or lower than a predetermined threshold, the pixels obtained at ST62 that are linked and are marking and weak character pixels and the pixels obtained at ST64 that are linked and are marking and non-character pixels are set as a non-image adjustment area /S45A. When $L^*\_diff$ obtained at ST66 is greater than the predetermined threshold and $a^*b^*\_diff$ obtained at ST83 is greater than the predetermined threshold, the pixels obtained at ST62 that are linked and are marking and weak character pixels and the pixels obtained at ST64 that are marking and non-character pixels are set as the image adjustment area S45A.

It is desirable that the predetermined threshold for $a^*b^*\_diff$ be a value about 10% of differences between respective maxima and minima of $a^*$ and $b^*$.

Figure 15A:
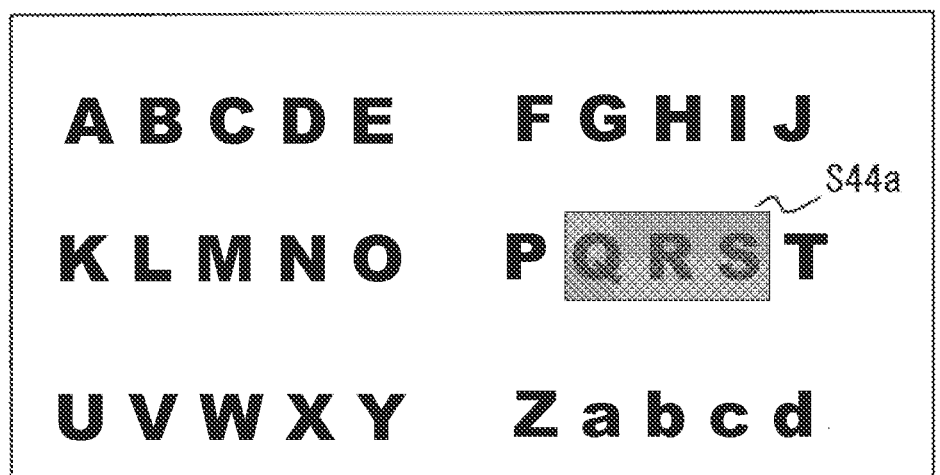
FIGS. 15A and 15B illustrate examples of images after image processing in the second embodiment of the present invention.
Figure 15B:
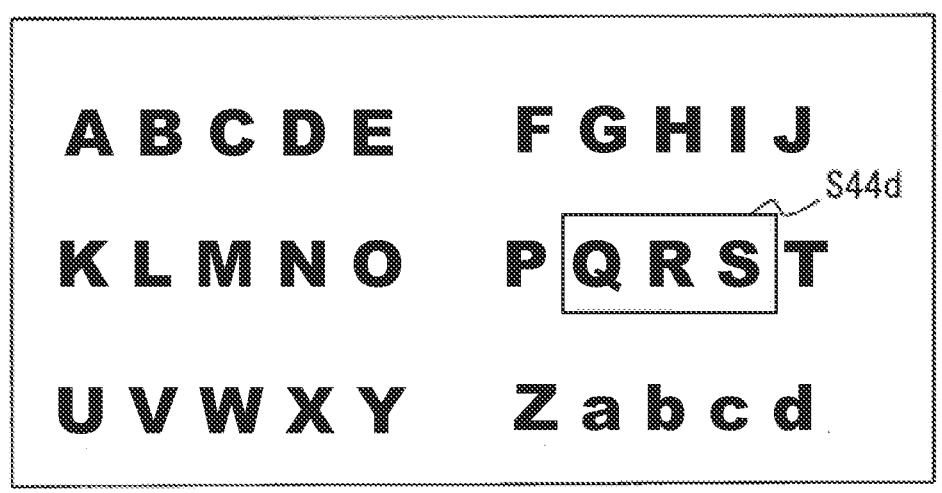

FIG. 14 illustrates another example of the original document 22 in which character areas and marking areas are mixed. FIGS. 15A and 15B illustrate examples of images after image processing of the second embodiment is performed with respect to the original document 22 of FIG. 14.

In first embodiment, when the brightness difference between the marking area and the character area covered by the marking is small, the marking area is set as non-image adjustment area /S45.

For example, it is assumed that, as in FIG. 14, in a case where a document for which characters having slightly higher brightness are used is read, a character string "QRS" in an area surrounded by a rectangle in a marking area S44d is marked using a red highlighter for emphasis. In this case, the brightness difference between the red marking and the characters covered by the marking is small, so that the area that is marked for emphasis is determined to be the non-image adjustment area /S45 in the processing of the first embodiment, and the marking area S44d is not subjected to image adjustment or is subjected to a different image processing such as one in which the area is filled in black, white or the like (the marking area S44a in FIG. 15A). As described above, in the first embodiment, the image adjustment area is determined based on only the brightness difference between the marking area and the characters covered by the marking area. Therefore, since the brightness difference is small for the case where gray characters are covered by red marking and the like, there is a problem that a marking area that is to be emphasized is messed up and cannot be read.

In contrast, in the second embodiment, whether or not a marking area is an image adjustment area is determined based on not only the brightness difference between the marking area and characters covered by the marking area but also the difference between color saturations thereof. Therefore, since there is a large difference between color saturation of the red color of the marking and color saturation of the gray color covered by the marking, the marking area S44d of FIG. 14 becomes the image adjustment area S45A, and the marking area that is to be emphasized is not messed up (marking area S44d of FIG. 15B).

Other operations of the image forming device 1A of the second embodiment of the present invention are the same as the operations of the image forming device 1 of the first embodiment, and therefore their description is omitted.

Effect of Second Embodiment

According to the image reading device 20A and the image forming device 1A of the second embodiment, in addition to the effect of the first embodiment, in performing the determination of the image adjustment area, not only the brightness difference between the marking area and the character string covered by the marking area, the difference between their color saturations is further taken into consideration. Therefore, in the case where a character string is marked in red for emphasis, the marking area becomes the image adjustment area S45A and thus the character string that is to be emphasized is not messed up.

Modified Embodiments

The present invention is not limited to the above first and second embodiments but various utilization forms and modified embodiments are possible. The utilization forms and modified embodiments can include, for example, the following (1)-(4).

(1) In the description of the first and second embodiments, alphabets are used as examples for the characters in the character area S43a. However, the characters in the character area S43a are not limited to alphabets, but are also applicable to Japanese Hiragana, Katakana characters, Chinese characters, Roman letters, and characters representing other languages.

(2) In the description of the first and second embodiments, the shape of the marking area S44 is a rectangle. However, the shape of the marking area S44 is not limited to a rectangle. The shape of the marking area emphasizing characters can also be, for example, a shape of an ellipse and the like.

(3) In the description of the first and second embodiments, two coefficient matrices for a case of processing toward the left and a case of processing toward the top are respectively illustrated FIGS. 7A and 7B as coefficient matrices for Sobel filters for extracting concentration differences for the character detector 43. However, the coefficient matrices for Sobel filters are not limited to the two coefficient matrices illustrated in FIGS. 7A and 7B. For example, when extracting the concentration differences, the processing can be performed by suitably using coefficient matrices that are different from the coefficient matrices illustrated in FIGS. 7A and 7B, such as coefficient matrices for a case of processing toward the right, a case of processing toward the bottom and a case of processing toward an oblique direction.

(4) In the description of the first and second embodiments, scanners are used as examples of the image reading devices 20, 20A. However, the image reading devices 20, 20A are not limited to scanners, but are also applicable to facsimile machines, multifunctional machines and the like that have an image reading function. It is noted that the image reading devices are examples of the image acquisition part.

The invention is not limited to an MFP that is able to complete all processes. Each or some parts of the invention can be physically separated from other parts. For example, the first image data is scanned somewhere, then emailed to a PC of the user. By the user copying the first image data to an MFP, the second image data can be generated in the MFP. Also, the user can create a document file including texts and the marking area, sends the document to a printer. The printer can perform the remaining processes. In the example, the marking area might be made with a predetermined grid, hatching, or patterns which are available in word processing software.

In the invention, an adjustment target area is defined as area where a character within the area is partially or entirely covered by the marking area, making the character relatively difficult to read. Further, such a state of the character in the adjustment target area is defined as an obscure state. A condition where the character in the adjustment target area is not visible is also included in the obscure state. The non-image adjustment area used in the above embodiments means the adjustment target area. The image processing applied to the non-image adjustment area is defined as a non-readable process. Based on the above embodiments, the non-readable process functions not to make the character readable, and includes follows:

Not to apply a contrast process, which enhances a contrast in the image data, to the adjustment target area so that a small contrast difference in the adjustment target area maintains. After the process, other area more than the adjustment target area in the image data, where the contrast process is applied to, become clearer to read.

To fill the adjustment target area with black or while pixels so that the character in the adjustment target area tunes into a non visible state.

Further, in the technical view, another image process that reduces a contrast difference in the adjustment target area may be included in the non-readable process. Due to the image process, the character in the adjustment target area, which is barely readable/visible, tunes into the non visible state. Or, another image process that disposes symbols over that adjustment target area in order to make the character difficult to read may be included in the non-readable process.

What is claimed is:

1. An image processing device, comprising:
an image acquisition part acquiring image data from a document;
a character detector detecting data of a character area, which includes at least a character therein, in the image data acquired from the document and outputting a character detection result;
a marking detector detecting data of a marking area, which is an area where a mark is drawn by a user, in the image data acquired from the document and outputting a marking detection result; and
an image processing part, based on the character detection result and the marking detection result, performing a non-readable process, which makes the character in the character area non-readable, to the data of the character area so as to create modified image data that is different from the image data acquired from the document and is to be used for an image forming process when the data in the character area is covered by the marking area and the non-readable process is determined necessary for making the character non-readable, not performing the non-readable process to the data of the character area when the data of the character area is not covered by the marking area.

2. The image processing device according to claim 1, further comprising:

an image adjustment area determination part determining, based on the character detection result and the marking detection result, whether or not the character that is covered by the mark is present in an obscure state in the image data, the obscure state meaning that the character is not clearly readable, wherein when the character is determined to be in the obscure state,
the image processing part determines that
the non-readable process is necessary,
the marking area including the character of the obscure state is an adjustment target area so that the non-readable process is performed thereto, and
any other area than the marking area is a non-adjustment target area so that the non-readable process is not performed thereto; and
the image processing part outputs the modified image data.

3. The image processing device according to claim 2, wherein the character detector obtains an edge amount of the character from the image data, and
the image adjustment area determination part determines, using the edge amount of the character, if the character is in the obscure state.

4. The image processing device according to claim 3, wherein the character detector uses a coefficient matrix of a Sobel filter to obtain the edge amount.

5. An image forming device for forming image data, comprising:

the image processing device according to claim 2; and
an image forming part that forms the modified image data with developer on a recording medium after the image processing device performs the non-readable process to the character.

6. The image processing device according to claim 2, wherein the image adjustment area determination part determines that the character is in the obscure state when a brightness difference between the character and the mark in the adjustment target area is lower than a predetermined value.

7. The image processing device according to claim 2, wherein the image adjustment area determination part determines that the character is in the obscure state when a difference of color saturation between the character and the mark in the adjustment target area is lower than a predetermined value.

8. The image processing device according to claim 2, wherein the non-readable process is
to apply a contrast process, which enhances a contrast of the data between the character area and the marking area, to the non adjustment target area,
not to apply the contrast process to the adjustment target area.

9. The image processing device according to claim 8, wherein the image processing part includes an operation part to which the user inputs an adjustment value for adjusting the contrast process of the non-readable process, and
the image processing part performs the contrast process using the adjustment value that is input via the operation part.

10. The image processing device according to claim 2, wherein the non-readable process is to fill the adjustment target area with black or white pixels.

11. The image processing device according to claim 1, wherein the image acquisition part is a scanner, acquiring the image data from the document on which the marking area is disposed by the user over the character area.

12. An image formation system, comprising:

an image acquisition part acquiring image data from a document;
a character detector detecting data of a character area, which includes at least a character therein, in the image data and outputting a character detection result;
a marking detector detecting data of a marking area, which is an area where a mark is drawn by a user and outputting a marking detection result;
an image processing part
performing a non-readable process, which makes the character in the character area non-readable, to the data of the character area so as to create modified image data that is different from the image data acquired from the document and is to be used for an image forming process when the data in the character are is covered by the marking area and the non-readable process is necessary for making the character non-readable, and
not performing the non-readable process to the data of the character area when the data of the character area is not covered by the marking area; and
outputting the modified image data,
an image forming part forming an image on a recording medium based on the modified image data output from the image processing part, wherein
one of the image acquisition part, the image processing part and the image forming part is physically separated from the other parts, and communicates with the other parts via a network.

13. The image formation system according to claim 12, further comprising:

an image adjustment area determination part determining, based on the character detection result and the marking detection result, whether or not the character that is covered by the mark is present in an obscure state in the image data, the obscure state meaning that the character is not clearly readable, wherein when the character is determined to be in the obscure state,
the image processing part determines that
the non-readable process is necessary,
the marking area including the character of the obscure state is an adjustment target area so that the non-readable process is performed thereto, and any other area than the marking area is a non-adjustment target area so that the non-readable process is not performed thereto.

14. The image formation system according to claim 13, wherein
the image adjustment area determination part determines that the character is in the obscure state when a brightness difference between the character and the mark in the adjustment target area is lower than a predetermined value.

15. The image formation system according to claim 13, wherein
the image adjustment area determination part determines that the character is in the obscure state when a difference of color saturation between the character and the mark in the adjustment target area is lower than a predetermined value.

16. An image processing method, comprising:
acquiring image data from a document;
detecting data of a character area, which includes at least a character therein, in the image data and outputting a character detection result;
detecting data of a marking area, which is an area where a mark is drawn by a user, in the image data and outputting a marking detection result;
performing a non-readable process, which makes the character in the character area non-readable, to the data of the character area so as to create modified image data that is different from the image data acquired from the document and is to be used for and image forming process when the character in the character area is covered by the marking area and the non-readable process is necessary for making the character non-readable, and
not performing the non-readable process to the data of the character area when the character in the character area is not covered by the marking area.

17. The image processing method according to claim 16, further comprising:
determining, based on the character detection result and the marking detection result, whether or not the character that is covered by the mark is present in an obscure state in the image data, the obscure state meaning that the character is not clearly readable, wherein
when the character is determined to be in the obscure state, it is determined that
the non-readable process is necessary,
the marking area including the character of the obscure state is an adjustment target area, and
any other area than the marking area is a non-adjustment target area, the non-readable process is performed to the adjustment target area,
the non-readable process is not performed to other than the adjustment target area, and
processed image data is output.

18. The image processing method according to claim 17, wherein
determining that the character is in the obscure state when a brightness difference between the character and the mark in the adjustment target area is lower than a predetermined value.

19. The image processing method according to claim 17, wherein
determining that the character is in the obscure state when a difference of color saturation between the character and the mark in the adjustment target area is lower than a predetermined value.

* * * * *